United States Patent [19]
Griswold

[11] Patent Number: 5,478,478
[45] Date of Patent: Dec. 26, 1995

[54] APPARATUS AND METHOD FOR PREVENTING VORTEXING OF A LIQUID IN A SEPARATORY FUNNEL

[75] Inventor: Sandra M. Griswold, Chester, Pa.

[73] Assignee: E. I. Du Pont de Nemours and Company, Wilmington, Del.

[21] Appl. No.: 171,995

[22] Filed: Dec. 22, 1993

[51] Int. Cl.$^6$ .................................................. B01D 17/02
[52] U.S. Cl. ...................... 210/745; 141/333; 141/339; 210/94; 210/534; 210/535; 210/801; 422/101
[58] Field of Search .................. 210/94, 513, 521, 210/535, 744, 745, 800, 801, 534; 422/101, 82.05, 99, 100; 141/331, 333, 335, 339, 340; 222/460; 436/165

[56] References Cited

U.S. PATENT DOCUMENTS

| | | | |
|---|---|---|---|
| 675,276 | 5/1901 | Hanson | 210/801 |
| 979,807 | 12/1910 | Squires | 141/340 |
| 1,170,892 | 2/1916 | Graham | 141/331 |
| 1,287,974 | 12/1918 | Gudges | 141/333 |
| 1,339,682 | 5/1920 | Allen | 210/801 |
| 1,620,815 | 3/1927 | Herschkowitsch et al. | 210/94 |
| 1,662,147 | 3/1928 | Farden | 141/339 |
| 2,136,170 | 11/1938 | Luertzing | 210/94 |
| 2,160,571 | 5/1939 | Bates | 210/94 |
| 2,325,657 | 8/1943 | Burkness | 210/94 |
| 3,257,170 | 6/1966 | Marcus et al. | 422/101 |
| 3,656,912 | 4/1972 | Sugawara | 422/101 |
| 3,713,778 | 1/1973 | Karamian | 210/535 |
| 4,696,741 | 9/1987 | Rahlwes | 210/535 |

FOREIGN PATENT DOCUMENTS 0198710  6/1989  European Pat. Off. .

Primary Examiner—Joseph W. Drodge

[57] ABSTRACT

The present invention relates to a separatory funnel for preventing vortexing of liquid and identifying an interface between immiscible liquids, said separatory funnel having a baffle plate completely covering the space directly above the outlet opening of the separatory funnel and positioned such that at least a portion of the periphery of the baffle plate is placed directly against the interior wall of the separatory funnel chamber, forming at least one passage for the flow of liquid through the chamber. The present invention also relates to a method of separating a mixture of at least two immiscible liquids that reduces contamination and allows the mixture to form a distinguishable interface so that the liquids can be separated.

13 Claims, 2 Drawing Sheets

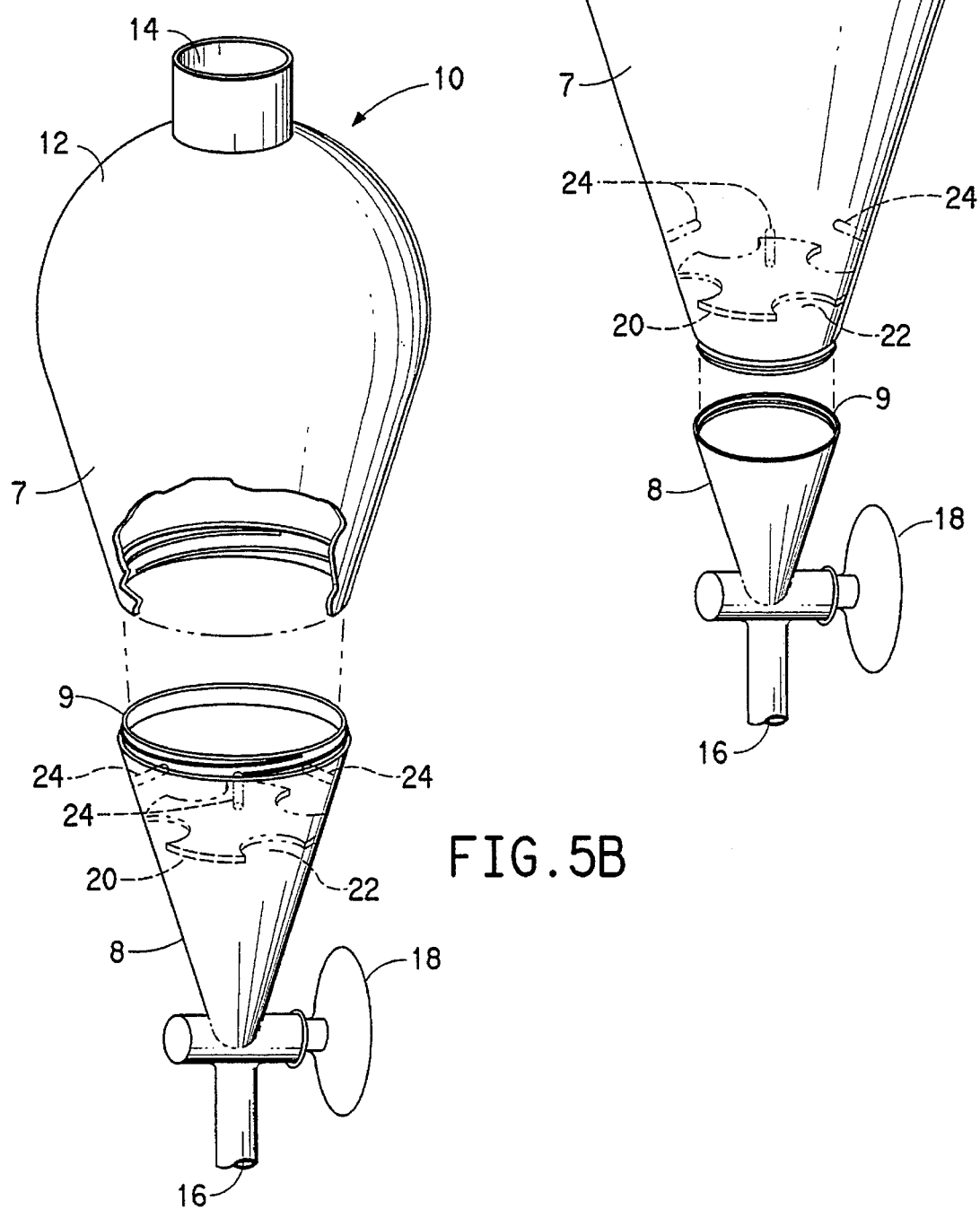

5,478,478

APPARATUS AND METHOD FOR PREVENTING VORTEXING OF A LIQUID IN A SEPARATORY FUNNEL

FIELD OF THE INVENTION

The present invention relates to an apparatus for preventing vortexing of a liquid and for identifying the interface between at least two immiscible liquids. The apparatus also reduces contamination of the liquids and allows the liquids to be separated. The present invention also relates to a method for separating immiscible liquids.

BACKGROUND OF THE INVENTION

In chemical and biochemical operations such as solvent extraction, steam distillation and azeotropic distillation, immiscible liquids must often be funneled and separated from each other. In liquid—liquid extractions, liquids may be contacted by agitation, followed by a settling period, followed by removal of one or more layers of liquid. Separatory funnels are usually used to make these separations. The separation of immiscible liquids, usually an organic soluble liquid and an aqueous soluble liquid, using a separatory funnel, is a well-known procedure.

Separatory or pouring funnels are conventional. Examples of such funnels can be found in U.S. Pat. No. 1,662,147 issued to Nels Farden on Mar. 13, 1928 and European Patent Specification EP-B1 198 710 published on Jun. 30, 1989. U.S. Pat. No. 1,662,147 describes a funnel of basically conventional shape to which have been longitudinally attached inwardly extending flanges which prevent the whirling tendency of liquid poured into the funnel. European Patent Specification EP-B1 198 710 describes a pouring funnel with one or more radially extending baffle members. The baffles are hollow, and formed as re-entrant portions of the wall of the funnel, so that their interior surfaces are open to the outside. This allows air to be vented from the funnel and prevents swirling of the liquid when poured through the funnel. In the above patent and publication, the outlet opening is completely unobstructed, never covered by the baffle or flanges.

A common problem with funnels used in funneling or dispensing liquids is that when a liquid is poured into the funnel and allowed to run out the funnel through its relatively small outlet opening, a whirling or circular motion is set up and may be carried to such an extent that a cavity will be formed through the body of the liquid. If the liquid is a mixture of immiscible liquids that have been allowed to separate into layers, this vortex can cause the layers to again mix, necessitating the need for additional separations or back extraction. During the operations of funneling, separating and dispensing, vortexing causes the liquid to flow through the funnel much more slowly than it would if the entire exit opening were constantly filled with liquid. Thus, a need exists to provide a funnel which will prevent the above described vortexing action of the liquid passing therethrough, thereby reducing the amount of time necessary for funneling, separating, or dispensing liquids.

Layers of immiscible liquids lend themselves to separation so long as there is enough distinction between them that their interface is discernible. However, it is often the case that the interface between two layers is virtually indistinguishable, especially with dark liquids. Thus, during separation a portion of the lower layer may be left in the funnel, or the upper layer may become mixed with the lower layer - both necessitating back extraction.

SUMMARY OF THE INVENTION

The present invention solves the problems of the prior art by providing an apparatus which will eliminate vortexing during funneling, separating or dispensing thus providing for more rapid flow through the apparatus.

The present invention also solves the problems of the prior art by providing an apparatus that will allow identification of an interface between at least two immiscible liquids in a mixture.

Further the present invention solves the problems of the prior art by providing a method by which a lower layer of one liquid may be efficiently removed from a mixture comprising at least two immiscible liquids which have a distinguishable interface from an upper layer of another liquid in a manner essentially free of contamination by reducing formation of emulsions and solid obstruction in the outlet of the apparatus, if a solid is present in the mixture, thus reducing or eliminating the need for back extraction.

To achieve the foregoing solutions and in accordance with the purpose of the invention as embodied and broadly described herein, there is provided a separatory funnel for preventing vortexing of a mixture comprising at least two immiscible liquids while separating said liquids comprising: a chamber having an inlet opening and an outlet opening for allowing the liquid to flow through the chamber; and a substantially horizontally aligned baffle plate disposed between the inlet opening and the outlet opening along the longitudinal axis of said chamber, said baffle plate positioned such that at least a portion of the periphery of said baffle plate is placed directly against the interior wall of said chamber forming at least one passage for the flow of liquid through said chamber wherein said baffle plate, the inlet opening and the outlet opening are spaced along the longitudinal axis of said chamber and said baffle plate is positioned between the inlet opening and the outlet opening such that at least a portion of said baffle plate completely covers the space directly above the outlet opening thereby preventing vortexing of the liquid as it flows through the chamber such that no passage or a portion of the passage is in axial alignment with the outlet opening.

Also in accordance with the purposes of the present invention as embodied and broadly described herein, there is provided an apparatus for identifying an interface between at least two immiscible liquids in a mixture, comprising: a chamber having an inlet opening and an outlet opening for allowing the liquids to flow through the chamber; and a substantially horizontally aligned baffle plate disposed between the inlet opening and the outlet opening along the longitudinal axis of said chamber, said baffle plate positioned such that at least a portion of the periphery of said baffle plate is placed directly against the interior wall of said chamber forming at least one passage for the flow of liquid through said chamber, such that no passage or a portion of the passage is in axial alignment with the outlet opening wherein the chamber is transparent, thereby allowing identification of the interface between the at least two immiscible liquids as the liquids flow through the chamber.

Further in accordance with the purposes of the present invention as embodied and broadly described herein, there is provided a method for separating at least two immiscible liquids in a mixture, comprising the steps of: pouring the mixture through a transparent chamber having an inlet opening and an outlet opening for allowing the liquids to flow through the chamber; allowing the mixture to form at least one distinguishable interface between a lower layer of one liquid and an upper layer of another liquid; allowing the mixture to flow through a passage formed by a substantially horizontally aligned baffle plate disposed in the chamber such that at least a portion of the periphery of said baffle plate is place directly against the interior wall of said chamber, until the one liquid has exited from said chamber leaving the liquid in the upper layer in the chamber; and regulating the flow of the one liquid in the lower layer from the chamber to separate the liquids.

BRIEF DESCRIPTION OF THE DRAWINGS

The accompanying drawings, which are incorporated in and constitute a part of the specification, illustrate the presently preferred embodiments of the invention and, together with the general description given above and the detailed description of the preferred embodiments given below, serve to explain the principles of the invention.

FIG. 5A is a perspective view of an apparatus according to the present invention showing the baffle plate disposed in the upper chamber.

FIG. 5B is a perspective view of an apparatus according to the present invention showing the baffle plate disposed in the lower chamber.

DETAILED DESCRIPTION OF THE PREFERRED EMBODIMENTS

Reference will now be made in detail to the present preferred embodiments of the invention as illustrated in the accompanying drawings.

Figure 1:
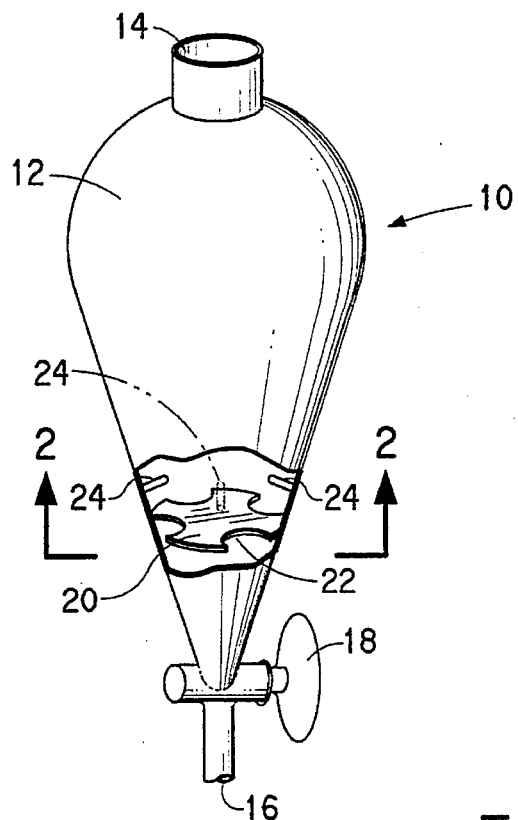
FIG. 1 is a cutaway perspective view of an apparatus according to the present invention.
Figure 2:
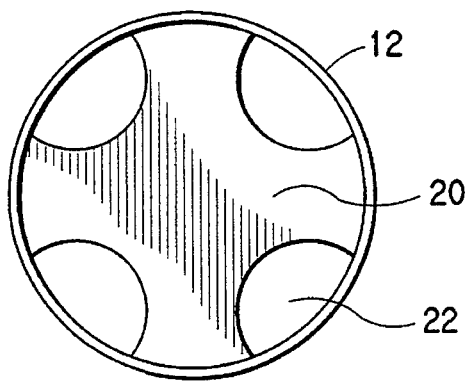
FIG. 2 is a cross-sectional view, taken across lines 2—2 of FIG. 1, of a baffle plate according to the present invention.
Figure 3:
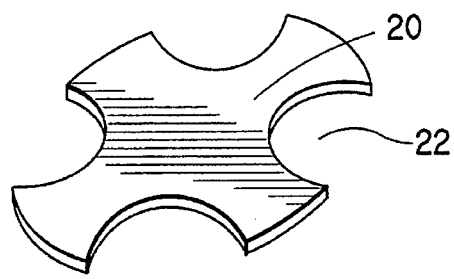
FIG. 3 is an isometric view of the baffle plate of FIG. 2 according to the present invention with the wall of the chamber cut away showing the passages formed between the periphery of the baffle and the interior wall of the chamber.

The present invention provides for an apparatus 10 for preventing vortexing of a mixture comprising at least one liquid while funneling said mixture. Optionally, the mixture further comprises at least one solid. The liquid is usually the product of solvent extraction, steam distillation, or azeotropic distillation, but may result from other reactions. Apparatus 10 of the present invention is shown in FIG. 1, FIG. 2., FIG. 5A and FIG. 5B. Apparatus 10 comprises a chamber 12 having an inlet opening 14 and an outlet opening 16 for allowing the liquid to flow through the chamber. Preferably chamber 12 is wide near inlet opening 14 tapering to a relatively narrow outlet opening 16. In a preferred embodiment, the chamber comprises a funnel, such as a pouring funnel or a separatory funnel. Inlet opening 14, provided near the upper end of chamber 12, may be wide as in conventional pouring funnels or relatively smaller as in separatory funnels. For example, in a 500 ml separatory funnel inlet opening 14 may be about 1⅛" may be fitted with a stopper or other type of closure to facilitate mixing of liquids.

As shown in FIG. 1, a baffle plate 20 is disposed between inlet opening 14 and outlet opening 16 along the longitudinal axis of chamber 12. In a preferred embodiment, baffle plate 20, inlet opening 14 and outlet opening 16 are spaced along the longitudinal axis of chamber 12, and baffle plate 20 is positioned between inlet opening 14 and outlet opening 16 such that at least a portion of baffle plate 20 lies in axial alignment with outlet opening 16. Thus, a portion of baffle plate 20 completely covers the space directly above outlet opening 16 as viewed along the longitudinal axis of chamber 12.

Figure 4:
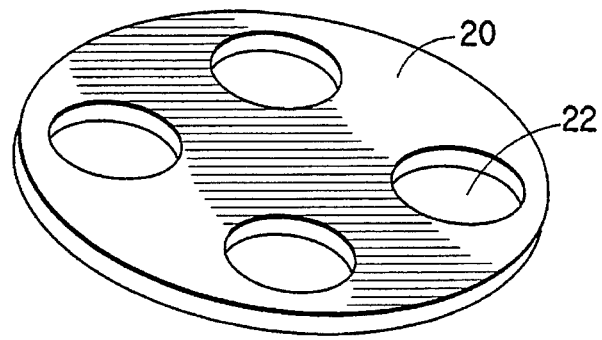
FIG. 4 is an isometric view of a baffle plate according to the present invention showing the passages formed within the baffle plate.

Baffle plate 20 is positioned such that at least a portion of the periphery of the baffle plate is placed directly against the interior wall of chamber 12, and forms at least one passage 22 for the flow of liquid therethrough. As can be seen from FIGS. 1 and 2, passage 22 may be formed between the periphery of baffle plate 20 and the interior wall of chamber 12, may be formed within baffle plate 20, as shown in FIG. 4, or a combination of both. A portion of baffle plate 20 completely covers the space directly above outlet opening 16 as viewed along the longitudinal axis of chamber 12. No passage 22 or portion of passage 22 is in axial alignment with outlet opening 16. There may be a plurality of passages 22 formed by baffle plate 20. Four passages 22 are preferred, and four evenly spaced passages 22 formed between the periphery of baffle plate 20 and the interior wall of chamber 12 is most preferred.

As shown in FIGS. 5A and 5B, chamber 12 may comprise an upper chamber piece 7 and lower chamber piece 8, chamber 12 being divided into upper chamber piece 7 and lower chamber piece 8 along a line 9 perpendicular to the longitudinal axis of chamber 12. In embodiments where separation of chamber 12 occurs in close proximity to baffle plate 20, baffle plate 20 may be disposed in either upper chamber piece 7 or lower chamber piece 8. Upper chamber piece 7 and lower chamber piece 8 are joined prior to use of apparatus 10. Joining may be accomplished by a variety of closing methods such as snapping upper chamber piece 7 and lower chamber piece 8 together or by screwing upper chamber piece 7 and lower chamber piece 8 together.

The apparatus of the present invention may further include means for regulating the flow of liquid from chamber 12. The regulating means may comprise a variety of valves, such as a check valve or a stopcock, as shown in FIG. 1. Alternatively, the regulating means may comprise any member that performs a valving function.

Baffle plate 20 is positioned within chamber 12 sufficient to prevent vortexing. Positioning of baffle plate 20 is such that a portion completely covers the space directly above outlet opening 16, as described above. In a preferred embodiment, baffle plate 20 is placed low in the chamber such that it is positioned along the longitudinal axis of chamber 12 such that the distance as measured along the longitudinal axis from the regulating means to baffle plate 20 is less than ⅕ of the distance measured along the longitudinal axis from the regulating means to inlet opening 14. For example, in a 500 ml separatory funnel, baffle plate 20 will be positioned about 1¼ inch above the stopcock. Baffle plate 20, as shown in FIGS. 1–5B, should be thick and sturdy enough to withstand the pressure of the liquid and stirring. Generally, for a 500 ml separatory funnel, baffle plate 20 will be about ⅛ inch thick. If baffle plate 20 is placed too high in chamber 12, the creation of another vortex beneath baffle plate 20 is likely, or if outlet opening 16 is left unobstructed vortexing may occur. Positioning baffle plate 20 such that a portion completely covers the space directly above outlet opening 16 and placing baffle plate 20 low in the chamber act to prevent vortexing. Vortexing not only decreases the rate of flow through apparatus 10 but acts to create emulsions which would cause contamination of the at least one liquid with other components, such as solids, in a settled mixture.

As shown in FIGS. 1, 5A, and 5B, apparatus 10 may also further comprise at least one spike 24 projecting from at least one of the interior walls of said chamber 12 and said baffle plate 20. In the instance where spike 24 projects from the interior wall of chamber 12 the spike is disposed between the inlet opening and said baffle plate in close proximity to said baffle plate and projects radially into the interior of chamber 12 and is inclined with respect to the longitudinal axis of chamber 12. In the instance where spike 24 projects from baffle plate 20, it does so vertically into the interior of chamber 12. Alternatively, spike 24 may project from both the interior wall of chamber 12 and from baffle plate 20. A plurality of spikes 24 is preferred. The plurality of spikes comprises spikes 24 projecting from either the interior wall of chamber 12, or baffle plate 20, or both. Spike 24 acts to break up gas bubbles in a mixture comprising liquid, thereby ridding the liquid of gas during funneling and prior to separation.

Apparatus 10 of the present invention may be constructed using many suitable materials. These include glass, metals or metal alloys or plastics. Preferably, chamber 12, baffle plate 20, and spike 24 are glass and the means for regulating the flow of liquid, usually a stopcock, is plastic or glass. Suitable plastics are polytetrafluoroethylene, as sold by E. I. du Pont de Nemours and Company of Wilmington, Del. under the trademark "TEFLON", nylon, polyethylene, polypropylene and polystyrene. Other plastics, however, may also be used and are considered to be within the scope of the present invention. In a preferred embodiment, chamber 12 and baffle plate 20 are transparent.

Apparatus 10 is also useful in reducing solid obstruction in the means for regulating the flow of liquid from chamber 12. In mixtures comprising at least one liquid and at least one solid, a portion of the solid will lay on top of baffle plate 20 and not pass through passage 22 into the regulating means, thus reducing the possibility of obstruction in the regulating means. Also, if mixtures need to be stirred, baffle plate 20 prevents the stir bar from interfering with the operation of the regulating means.

Immiscible liquids, such as organic and aqueous liquids, lend themselves to fairly accurate separation so long as there is enough distinction between them that their interface is discernible. It is sometimes the case, though, that it is difficult to see the interface between two layers of liquid to be separated. This is especially true with dark liquids. Thus, in accordance with a further aspect of the present invention, there is provided an apparatus 10 for identifying an interface between at least two immiscible liquids. In a preferred embodiment, apparatus 10 comprises chamber 12, as described above, wherein chamber 12 is transparent which allows for identification of the interface between at least two immiscible liquids. Baffle plate 20 is disposed within the transparent chamber, baffle plate 20 positioned such that at least a portion of the periphery of said baffle plate is placed directly against the interior wall of said chamber forming at least one passage 22 for the flow of liquid therethrough. When at least two immiscible liquids are poured into transparent chamber 12, they come into contact with baffle plate 20 and proceed to flow through passage 22. As the liquids flow through the chamber, the interface between the two immiscible liquids may be visible due to the fact that the chamber is transparent and one can see the clinging action of the liquids towards the baffle plate and interior wall of the chamber. This clinging action is due to surface tension of the liquids at the interface. Viewing this clinging action of the liquids towards the baffle plate and interior wall of the chamber through the transparent chamber thus allows identification of the interface between the at least two immiscible liquids.

In situations where the interface is not visible until it approaches the baffle plate, it is preferred that baffle plate 20 is transparent. In this situation, the apparatus is believed to operate on the principle that baffle plate 20 causes a refraction of the light. The light bends, whereby it passes into the liquid held within chamber 12 and, in effect, highlights the interface between the at least two immiscible liquids. As light enters transparent baffle plate 20 of the present invention, the light passes through the interface between the immiscible liquids, thus making their interface more discernible.

The present invention also provides for a rapid and efficient method of separating at least two immiscible liquids in a mixture. This method comprises the steps of pouring the mixture through an apparatus comprising a transparent chamber having an inlet opening and an outlet opening, thereby allowing the liquids to flow through the chamber, and allowing the mixture to form at least one distinguishable interface between a lower layer of one liquid and an upper layer of another liquid. The method of the present invention also includes the steps of allowing the mixture to flow through a passage formed by a substantially horizontally aligned baffle plate disposed in the transparent chamber such that at least a portion of the periphery of said baffle plate is placed directly against the interior wall of said chamber, until the one liquid has exited from said chamber leaving the liquid in the upper layer in the chamber and regulating the flow of the one liquid in the lower layer from the chamber to separate the liquids. In a preferred embodiment, the apparatus comprises apparatus 10, as described above. Vortexing is a common problem with apparatus used in funneling, separating or dispensing liquids. As described above, baffle plate 20 is positioned within the chamber such that vortexing is prevented. The method of the present invention thus eliminates vortexing. When a mixture comprising a liquid is poured into chamber 12, the mixture essentially "sits" on baffle plate 20, and then flows smoothly, without agitation or whirling action, through passage 22 formed by baffle plate 20. By eliminating vortexing the method of the present invention acts to reduce the formation of emulsions. In mixtures comprising at least two immiscible liquids, vortexing can cause distinct layers of immiscible liquids that have settled to again mix, forming emulsions which causes contamination of one liquid with another liquid and necessitates the need for additional separations. However, with the present invention, the formation of emulsions is reduced, contamination between layers is reduced and separation of immiscible liquids may proceed quickly.

A further aspect of the method of the present invention is that as the liquids flow through the chamber, the interface between the two immiscible liquids may be visible due to the clinging action of the liquids towards the baffle plate and interior wall of the chamber. This clinging action is due to the surface tension of the liquids at the interface. Viewing this clinging action of the liquids towards the baffle plate and interior wall of the chamber through the transparent chamber thus allows for identification of the interface between the at least two immiscible liquids.

In situations where the interface is not visible until it approaches the baffle plate, the step of allowing the mixture to flow through a passage formed by a baffle plate comprises allowing the mixture to flow through a transparent baffle plate. This aspect of the method of the present invention is believed to operate on the principle that the transparent baffle plate 20 causes a refraction of the light as described above. The light bends whereby it passes into the liquid held within chamber 12 and, in effect, highlights the interface between the at least two immiscible liquids. This identification of the interface makes it easy to identify when the one liquid in the lower layer has exited the chamber at which time the flow of the one liquid is regulated.

What is claimed is:

1. A separatory funnel adapted for preventing vortexing of a mixture comprising at least two immiscible liquids while separating said liquids, comprising:

a chamber having a longitudinal axis an inlet opening and an outlet opening for allowing the liquid to flow through the chamber; and a substantially horizontally aligned baffle plate disposed between the inlet opening and the outlet opening along the longitudinal axis of said chamber, said baffle plate positioned such that at least a portion of the periphery of said baffle plate is placed directly against the interior wall of said chamber forming at least one passage for the flow of liquid through said chamber such that no passage or portion of any of the at least one passage is in axial alignment with the outlet opening, wherein said baffle plate, the inlet opening and the outlet opening are spaced along the longitudinal axis of said chamber and said baffle plate is positioned between the inlet opening and the outlet opening such that at least a portion of said baffle plate completely covers the space directly above the outlet opening, thereby preventing vortexing of liquid as it flows through the chamber.

2. The apparatus of claim 1 further comprising at least one spike projecting from at least one of the interior wall of said chamber and said baffle plate.

3. The apparatus of claim 1 wherein said chamber comprises an upper chamber piece and a separate lower chamber piece, said chamber being divided along a line perpendicular to the longitudinal axis of said chamber.

4. The apparatus of claim 1 wherein the at least one passage is formed within the baffle plate.

5. The apparatus of claim 1 wherein the, at least one passage is formed between the periphery of said baffle plate and the interior wall of said chamber.

6. The apparatus of claim 1 wherein the at least one passage comprises a plurality of passages.

7. The apparatus of claim 1 further including means for regulating the flow of liquid from said chamber.

8. The apparatus of claim 7 wherein said baffle plate is positioned along the longitudinal axis of the chamber such that the distance as measured along the longitudinal axis from the regulating means to said baffle plate is less than ⅕ of the distance measured along the longitudinal axis from the regulating means to the inlet opening.

9. An apparatus for identifying an interface between at least two immiscible liquids in a mixture, comprising:

a chamber having a longitudinal axis an inlet opening and a outlet opening for allowing the liquids to flow through the chamber; and a substantially horizontally aligned baffle plate disposed between the inlet opening and the outlet opening along the longitudinal axis of said chamber, said baffle plate positioned such that at least a portion of the periphery of said baffle plate is placed directly against the interior wall of said chamber forming at least one passage for the flow of liquid through said chamber such that no passage or portion of any of the at least one passage is in axial alignment with the outlet opening, wherein the chamber is transparent, thereby allowing identification of the interface between the at least two immiscible liquids as the liquids flow through the chamber.

10. The apparatus of claim 9 wherein said baffle plate is transparent;

whereby as the interface between the at least two immiscible liquids approaches and flows through the at least one passage of said baffle plate the interface between the immiscible liquids becomes visible thereby allowing identification of the interface between the immiscible liquids.

11. A method for separating at least two immiscible liquids in a mixture, comprising the steps of:

(a) pouring the mixture through a transparent chamber having an inlet opening and an outlet opening;

(b) allowing the mixture to form at least one distinguishable interface between a lower layer of one immiscible liquid and an upper layer of another immiscible liquid;

(c) allowing the mixture to flow through at least one passage formed by a substantially horizontally aligned baffle plate, disposed in the chamber such that at least a portion of the periphery of said baffle plate is placed directly against the interior wall of said chamber, until the one liquid has exited from said chamber leaving the liquid in the upper layer in the chamber; and (d) regulating the flow of the one liquid in the lower layer from the chamber to separate the liquids.

12. The method of claim 1 wherein step (b) further comprises identifying the at least one interface between the at least two immiscible liquids by viewing through the transparent chamber the clinging action of the at least two immiscible liquids towards the baffle plate and the interior wall of the chamber.

13. The method of claim 11 wherein step (c) comprises allowing the mixture to flow through at least one passage formed by a transparent baffle plate so that as the interface between the at least two immiscible liquids approaches and flows through at least one passage of said baffle plate the interface between the at least two immiscible liquids becomes visible.

* * * * *